Patented Nov. 14, 1944

2,362,441

UNITED STATES PATENT OFFICE 2,362,441

CANNING MEAT PRODUCTS

Lloyd B. Jensen and Walter R. Hess, Chicago, Ill., assignors to Industrial Patents Corporation, Chicago, Ill., a corporation of Delaware No Drawing. Application March 4, 1942,
Serial No. 433,294

6 Claims. (Cl. 99—187)

This invention relates to the canning of food products and more particularly has to do with an improved method of canning meat products to prevent gas formation. The invention is concerned specifically with the use of a particular type of sugar in canned cured meats whereby fermentation with subsequent acid and gas formation is avoided.

In preparing canned meat, such as ham, spiced ham, and the like, the meat is first cured or mixed with the proper seasoning materials and is then placed in cans which are sealed. After sealing, the cans are heated to sterilizing temperatures, for examples, 140° F. to 212° F., to sterilize the contents. Considerable difficulty has been experienced in securing sufficient sterilization to prevent gas formation which will swell the cans or to avoid acid formation which will impair the flavor. It has been shown heretofore that the bacteria causing gaseous fermentation in sugar-nitrate-nitrite cured canned spiced ham and other comminuted canned cured meats are members of the genus Bacillus. Although these bacteria are generally regarded as non-gas formers from carbohydrate substrates, most species produce acid or voluminous amounts of carbon dioxide gas or both when growing in sugar-cured meats at temperatures ranging from 75° F. to 120° F.

In view of the above considerations, the present invention has for an object a method of preparing canned sugar-cured meat whereby the difficulty of acid and gas formation are substantially overcome.

Another object of the invention is to devise an improved formula for a curing agent which is not susceptible to acid and gas formation when used in canned meats.

A further object of the invention is to use a particular sugar in curing meats so that the sugar will not be fermented by the bacteria after the meat is canned.

When the bacteria of the genus Bacillus are excluded entirely from canned nitrate-sugar-cured comminuted meats, the cans will not show the characteristic carbon dioxide swells under incubation. However, these bacteria are so widely distributed in nature that it is difficult to exclude all of them from the products going into the cans. Thus great numbers of these bacilli have been found in various raw materials used for food and, notwithstanding the sterilization of some of the ingredients, such as spices, of the meat product, it is impractical to pre-sterilize the entire contents of the can. Furthermore, these bacteria are spore bearing and conditions sufficiently drastic to kill the spores cannot be used without impairing the flavor of the meat.

In our study of acid and gas formation by the genus Bacillus in carbohydrate substrates, we observed that fermentation takes place with the formation of acid or gas or both in a nitrate-sugar-meat media, whereas such formation does not occur in a sugar-broth media without the presence of sodium nitrate. This was true not only with the disaccharides, where apparently the added meat and nitrate made possible the mechanism to break the disaccharide linkage to hexoses, but also was true with the pentoses, such as xylose. Our study further indicated that the mechanism of gas formation in nitrate-sugar-meat media includes first the breaking down of any disaccharides to monosaccharides as shown by the presence of monosaccharides early in the fermentation of media containing originally only disaccharides. Later, lactic acid is formed in appreciable quantities and often much carbon dioxide gas. The order of breakdown appears to be from a disaccharide to hexoses, then to triose compounds, then to pyruvic acid. A part of the pyruvic acid is reduced to lactic acid and a part is split into acetalydehyde and carbon dioxide. With some strains of bacteria the breakdown may terminate at the pyruvic or lactic acid stage.

We have now found that acid or acid and gas formation may be avoided in a nitrate-sugar-meat media provided lactose is used as the sugar ingredient. This remarkable property appears to be specific to lactose. We have tested a wide variety of sugars and a large number of the Bacilli organisms in nitrate-sugar-meat media and in all instances acid or acid and gas formation was observed except in those instances wherein lactose was used. For example, comparative fermentation tests have been made on nitrate-sugar-meat media containing such sugars as sucrose, lactose, maltose, trehalose, dextrose, levulose, galactose, xylose, arabinose, mannose, salicin and inulin, using twenty-four different strains belonging to the genus Bacillus with each sugar, and acid or acid and gas formation was found in every test except those in which lactose was the sugar ingredient.

As an example, a suitable formula for the curing agent of the present invention may include sodium nitrate, sodium nitrite, salt and lactose which may be used in about the following percentages by weight based on the meat treated:

| | |
|---|---|
| Sodium nitrate | 0.05 –0.2 |
| Sodium nitrite | 0.005–0.02 |
| Salt | 2 –5 |
| Lactose | 0.5 –3 |

The following is an illustration of a practical formula in parts by weight of materials for treating chopped pork in the preparation of spiced ham:

| | Parts by weight |
|---|---|
| Lactose | 8 |
| Sodium nitrate | 5/8 |
| Sodium nitrite | 1/32 |
| Salt | 14 |

Plus spices as desired.

In practicing the invention, a curing agent is prepared containing the following ingredients in about the proportions indicated:

| | | |
|---|---|---|
| Lactose | pounds | 8 |
| Sodium nitrate | ounces | 10 |
| Sodium nitrite | do | ½ |
| Salt | pounds | 14 |

Four hundred pounds of chopped pork comprising mainly ham and shoulder is treated with the curing agent by incorporating the dry material into the meat with a mechanical mixer. The mixture is allowed to stand for twenty-four to seventy-two hours in a cooler at a temperature of around 38° F. to cure. The cured product is then removed from the cooler and the air is removed therefrom in a vacuum chamber. The mixture is next stuffed into cans, which are sealed under vacuum. The cans are placed in a cooker and cooked in hot water at a temperature of about 155° F. Thereafter the cans are chilled and packed for shipping.

The amount of lactose used in the present invention may be substantially the same as the amount of sugar used in conventional practice. However, we have found that a smaller amount, for example one-quarter to one-half of the amount of sugar required in the regular formula is often satisfactory. The amount of lactose, of course, may be varied depending on the flavor desired.

While the invention is particularly adapted for preparing canned spiced ham, it may be used for preparing other canned cured meats, such as ham, pork loins, luncheon meat, etc.

Obviously, many modifications and variations of the invention hereinbefore set forth may be made without distinguishing from the spirit and scope thereof, and therefore only such limitations should be imposed as are indicated in the appended claims.

We claim:

1. A process of inhibiting acid and gas formation in canned sugar-nitrate cured meats, which comprises incorporating lactose as essentially the only added sweetening ingredient in the product.

2. A process for canning meat which comprises forming a nitrate-sugar-meat product containing lactose as essentially the only sugar component, charging said product into the can, sealing the can and sterilizing the resulting product.

3. A process for preparing sugar-cured meat for canning which comprises mixing lactose, meat and nitrate in such proportions to produce a sugar-cured product and subjecting the mixture to curing conditions of temperature and time, said mixture being free from gas forming sugars in sufficient amount to cause gas formation in the canned product.

4. A canned meat product substantially free from gas formation which comprises a sterilized mixture of meat, nitrate and sugar, said product characterized by containing lactose as essentially the only sugar ingredient.

5. A canned meat product substantially free from gas formation which comprises a sterilized mixture of sugar-cured meat, said product containing lactose as the sole sugar ingredient in amount sufficient to impart flavor.

6. A process for canning sugar-cured meat to prevent acid and gas formation which comprises charging meat, nitrate and lactose to the can and sterilizing the product, said lactose being substantially the sole sugar ingredient.

LLOYD B. JENSEN.
WALTER R. HESS.